(12) United States Patent
Min et al.

(10) Patent No.: US 9,083,987 B2
(45) Date of Patent: Jul. 14, 2015

(54) METHOD AND APPARATUS FOR ENCODING AND DECODING IMAGE THROUGH INTRA PREDICTION

(75) Inventors: Jung-hye Min, Suwon-si (KR); Sun-il Lee, Yongin-si (KR); Woo-jin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 842 days.

(21) Appl. No.: 13/184,096

(22) Filed: Jul. 15, 2011

(65) Prior Publication Data

US 2012/0014444 A1  Jan. 19, 2012

Related U.S. Application Data

(60) Provisional application No. 61/364,986, filed on Jul. 16, 2010.

(30) Foreign Application Priority Data

Oct. 6, 2010 (KR) .................. 10-2010-0097424

(51) Int. Cl.
*H04N 7/32* (2006.01)
*H04N 19/593* (2014.01)
*H04N 19/176* (2014.01)
*H04N 19/196* (2014.01)
*H04N 19/80* (2014.01)

(52) U.S. Cl.
CPC ........... *H04N 19/593* (2014.11); *H04N 19/176* (2014.11); *H04N 19/196* (2014.11); *H04N 19/80* (2014.11)

(58) Field of Classification Search
CPC .................. H04N 19/00042; H04N 19/00763; H04N 7/176; H04N 7/1966
USPC ........................ 375/240.12, 240.14, 240.24
See application file for complete search history.

(56) References Cited

U.S. PATENT DOCUMENTS

| | | | |
|---|---|---|---|
| 2007/0098071 | A1 | 5/2007 | Ohgose |
| 2007/0133891 | A1 | 6/2007 | Jeong |
| 2009/0110069 | A1 | 4/2009 | Jung et al. |
| 2009/0310677 | A1 | 12/2009 | Shiodera et al. |
| 2010/0002775 | A1 | 1/2010 | Huang et al. |
| 2010/0054331 | A1 | 3/2010 | Haddad et al. |
| 2010/0208803 | A1 | 8/2010 | Matsuo et al. |

(Continued)

FOREIGN PATENT DOCUMENTS

| | | |
|---|---|---|
| EP | 2 200 324 A1 | 6/2010 |
| KR | 1020110018188 A | 2/2011 |

(Continued)

OTHER PUBLICATIONS

Communication, dated Sep. 27, 2013, issued by the New Zealand Intellectual Property Office in counterpart New Zealand Patent Application No. 606080.

(Continued)

*Primary Examiner* — Jorge L Ortiz Criado
*Assistant Examiner* — Albert Kir
(74) *Attorney, Agent, or Firm* — Sughrue Mion, PLLC

(57) ABSTRACT

A method and apparatus for encoding and decoding an image through intra prediction using a pixel of the neighboring block along an extended line having a predetermined gradient about a pixel inside the current block.

8 Claims, 15 Drawing Sheets

(56) References Cited

U.S. PATENT DOCUMENTS

2011/0249732 A1* 10/2011 Segall et al. ............. 375/240.12
2014/0133557 A1    5/2014 BOON et al.

FOREIGN PATENT DOCUMENTS

| KR | 1020110018189 A | 2/2011 |
| RU | 2386222 C2 | 4/2010 |
| WO | 2009051091 A1 | 4/2009 |
| WO | WO2010002214 * 7/2010 | ............... H04N 7/32 |

OTHER PUBLICATIONS

Communication, dated Nov. 6, 2013, issued by the Australian Patent Office in counterpart Australian Patent Application No. 2011277214.
International Search Report (PCT/ISA/210) issued on Feb. 28, 2012 in the International Patent Application No. PCT/KR2011/005214.
Communication from the Russian Patent Office dated Jan. 22, 2015 in a counterpart Russian application no. 2013106810/08 Y.

* cited by examiner

FIG. 2

| SIZE OF BLOCK | NUMBER OF PREDICTION MODES | | |
|---|---|---|---|
| | Example 1 | Example 2 | Example 3 |
| 2x2 | – | 5 | 5 |
| 4x4 | 9 | 9 | 9 |
| 8x8 | 9 | 9 | 9 |
| 16x16 | 33 | 17 | 11 |
| 32x32 | 33 | 33 | 33 |
| 64x64 | 5 | 5 | 9 |
| 128x128 | 5 | 5 | 5 |

FIG. 3

| PREDICTION MODE | NAME |
|---|---|
| 0 | VERTICAL |
| 1 | HORIZONTAL |
| 2 | DC |
| 3 | DOWN_LEFT |
| 4 | DOWN_RIGHT |
| 5 | VERTICAL_RIGHT |
| 6 | HORIZONTAL_DOWN |
| 7 | VERTICAL_LEFT |
| 8 | HORIZONTAL_UP |

PREDICTION MODE DIRECTION

■ : NEIGHBORING PIXEL

REPRESENTATIVE INTRA PREDICTION MODE

METHOD AND APPARATUS FOR ENCODING AND DECODING IMAGE THROUGH INTRA PREDICTION

CROSS-REFERENCE TO RELATED PATENT APPLICATION

This application claims the benefits of U.S. Provisional Patent Application No. 61/364,986, filed on Jul. 16, 2010, in the United States Patent and Trademark Office, and priority from Korean Patent Application No. 10-2010-0097424, filed on Oct. 6, 2010, in the Korean Intellectual Property Office, the disclosures of which are herein incorporated by reference in their entireties.

BACKGROUND

1. Field

Exemplary embodiments of the present disclosure relate to encoding and decoding of an image, and more particularly, to a method and apparatus for encoding and decoding an image through intra prediction which may improve image compression efficiency by using intra prediction modes having various directivities.

2. Description of the Related Art

According to an image compression standard, such as moving picture expert group (MPEG)-1, MPEG-2, MPEG-4, or H.264/MPEG-4 advanced video coding (AVC), a picture is split into macroblocks to encode an image. After each of the macroblocks is encoded in any of inter prediction and intra prediction encoding modes, an appropriate encoding mode is selected according to a bit rate required for encoding the macroblock and an allowable distortion between the original macroblock and the reconstructed macroblock, and then the macroblock is encoded in the selected encoding mode.

As hardware for reproducing and storing high resolution or high quality image content is being developed, a need for a video codec that effectively encodes or decodes the high resolution or high quality video content is increasing. In a conventional video codec, a video is encoded in a limited encoding mode based on a macroblock having a predetermined size.

SUMMARY

The exemplary embodiments provide a method and apparatus for encoding and decoding an image through intra prediction by using intra prediction modes having various directivities.

The exemplary embodiments also provide a method and apparatus for encoding and decoding an image through intra prediction which may reduce the amount of calculation performed during the intra prediction.

According to an aspect of an exemplary embodiment, there is provided a method of intra prediction encoding an image, the method including: dividing a current picture of the image into at least one block having a predetermined size; determining, from among pixels of a neighboring block previously reconstructed before a pixel of the at least one block, a pixel of the neighboring block along an extended line having a predetermined gradient about the pixel of the at least one block; and predicting the pixel of the at least one block using the determined pixel of the neighboring block.

According to another aspect of an exemplary embodiment, there is provided a method of intra prediction decoding an image, the method including: dividing a current picture of the image into at least one block having a predetermined size; extracting intra prediction mode information that indicates an intra prediction mode applied to the at least one block from a bitstream; and performing intra prediction on the at least one block according to the intra prediction mode indicated by the extracted intra prediction mode information, wherein in the intra prediction mode, a pixel of a neighboring block predicts a pixel of the at least one block, the pixel of the neighboring block determined from among pixels of the neighboring block previously reconstructed before the pixel of the at least one block using an extended line having a predetermined gradient about the pixel of the at least one block.

According to another aspect of an exemplary embodiment, there is provided apparatus for intra prediction encoding an image, the apparatus including an intra prediction unit that determines a pixel of a neighboring block from among pixels of the neighboring block which are previously reconstructed before a pixel of a current block of the image using an extended line having a predetermined gradient about the pixel of the current block, and predicts the pixel of the current block using the determined pixel of the neighboring block.

According to another aspect of an exemplary embodiment, there is provided an apparatus for intra prediction decoding an image, the apparatus including an intra prediction unit that extracts intra prediction mode information that indicates an intra prediction mode applied to a current block of the image from a bitstream and performs intra prediction on the current block according to the intra prediction mode indicated by the extracted intra prediction mode information, wherein in the intra prediction mode, a pixel of a neighboring block predicts a pixel of the current block, the pixel of the neighboring block determined from among pixels of the neighboring block previously reconstructed before the pixel of the current block using an extended line having a predetermined gradient about the pixel of the current block.

Since intra prediction is performed in various directions, image compression efficiency may be improved.

The amount of calculation performed to determine a reference pixel during intra prediction may be reduced.

BRIEF DESCRIPTION OF THE DRAWINGS

The above and other aspects will become more apparent by describing in detail exemplary embodiments thereof with reference to the attached drawings in which:

FIG. 2 is a diagram illustrating a number of intra prediction modes according to a size of a current block, according to an exemplary embodiment;

FIG. 3 is a diagram for explaining intra prediction modes applied to a block having a predetermined size, according to an exemplary embodiment;

DETAILED DESCRIPTION OF EXEMPLARY EMBODIMENTS

The exemplary embodiments will now be described more fully with reference to the accompanying drawings, in which the exemplary embodiments are shown.

Figure 1:
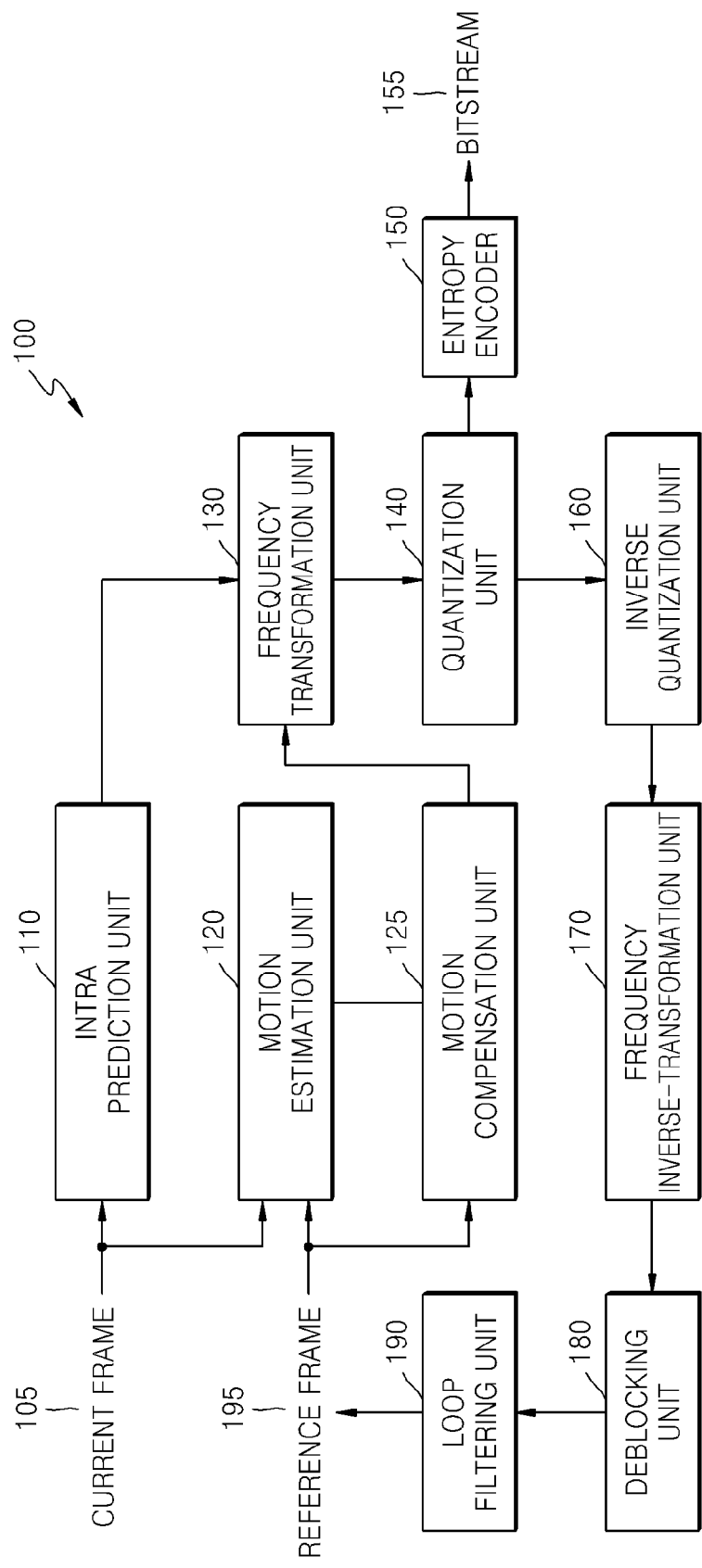
FIG. 1 is a block diagram illustrating an apparatus for encoding an image, according to an exemplary embodiment.

FIG. 1 is a block diagram illustrating an apparatus 100 for encoding an image, according to an exemplary embodiment.

Referring to FIG. 1, the apparatus 100 includes an intra prediction unit 110, a motion estimation unit 120, a motion compensation unit 125, a frequency transformation unit 130, a quantization unit 140, an entropy encoder 150, an inverse quantization unit 160, a frequency inverse-transformation unit 170, a deblocking unit 180, and a loop filtering unit 190.

The motion estimation unit 120 and the motion compensation unit 125 perform inter prediction that divides a current frame 105 of a current picture into blocks, each having a predetermined size, and searches for a prediction value of each of the blocks in a reference picture.

The intra prediction unit 110 performs intra prediction that searches for a prediction value of a current block by using pixels of neighboring blocks of a current picture. In particular, the intra prediction unit 110 additionally performs intra prediction modes having various directivities by using (dx, dy) parameters in addition to a conventional intra prediction mode. The added intra prediction modes according to the present exemplary embodiment will be explained later.

Residual values of the current block are generated based on a prediction value output from the intra prediction unit 110 and the motion compensation unit 125, and are output as quantized transform coefficients through the frequency transformation unit 130 and the quantization unit 140.

The quantized transform coefficients are restored to residual values through the inverse quantization unit 160 and the frequency inverse-transformation unit 170, and the restored residual values are post-processed through the deblocking unit 180 and the loop filtering unit 190 and are output to a reference frame 195. The quantized transform coefficients may be output as a bitstream 155 through the entropy encoder 150.

Intra prediction performed by the intra prediction unit 110 of FIG. 1 will be explained in detail. An intra prediction method for improving image compression efficiency will be explained by assuming a codec that may perform compression encoding by using a block having a size greater or less than 16×16 as a coding unit, not a conventional codec such as H.264 that performs encoding based on a macroblock having a size of 16×16.

FIG. 2 is a diagram illustrating a number of intra prediction modes according to a size of a current block, according to an exemplary embodiment.

A number of intra prediction modes to be applied to a block may vary according to a size of the block. For example, referring to FIG. 2, when a size of a block to be intra-predicted is N×N, a number of intra prediction modes actually performed on each of blocks having respective sizes of 2×2, 4×4, 8×8, 16×16, 32×32, 64×64, and 128×128 may be set to be 5, 9, 9, 17, 33, 5, and 5 (in the case of Example 2). As such, a number of intra prediction modes actually performed varies according to a size of a block, since overhead for encoding prediction mode information varies according to the size of the block. In other words, in the case of a block having a small size, although the block occupies a small part of an entire image, overhead for transmitting additional information, such as a prediction mode of the block having the small size, may be high. Accordingly, if a block having a small size is encoded by using too many prediction modes, a bit rate may be increased, thereby reducing compression efficiency. Also, since a block having a large size, for example, a size greater than 64×64, is often selected as a block for a flat area of an image, when the block having the large size is encoded by using too many prediction modes, compression efficiency may also be reduced.

Accordingly, in FIG. 2, if sizes of blocks are roughly classified into at least three sizes $N1 \times N1 (2 \leq N1 \leq 8$, N1 is an integer), $N2 \times N2 (16 \leq N2 \leq 32$, N2 is an integer), and $N3 \times N3$ ($64 \leq N3$, N3 is an integer), a number of intra prediction modes to be performed on the block having the size of N1×N1 is A1 (A1 is a positive integer), a number of intra prediction modes to be performed on the block having the size of N2×N2 is A2 (A2 is a positive integer), and a number of intra prediction modes to be performed on the block having the size of N3×N3 is A3 (A3 is a positive integer), it is preferable that a number of intra prediction modes to be performed according to a size of each block is set to satisfy a relationship of $A3 \leq A1 \leq A2$. That is, when a current picture is roughly divided into a block having a small size, a block having an intermediate size, and a block having a large size, it is preferable that the block having the intermediate size is set to have a greatest number of prediction modes, and the block having the small size and the block having the large size are set to have a relatively small number of prediction modes. However, the present exemplary embodiment is not limited thereto, and the block having the small size and the block having the large size may be set to have a great number of prediction modes. A number of prediction modes varying according to a size of each block illustrated in FIG. 2 is an example, and may be changed.

FIG. 3 is a diagram for explaining intra prediction modes applied to a block having a predetermined size, according to an exemplary embodiment.

Referring to FIGS. 2 and 3, when intra prediction is performed on a block having a size of 4×4, the block having the size of 4×4 may have a vertical mode (mode 0), a horizontal mode (mode 1), a direct current (DC) mode (mode 2), a diagonal down left mode (mode 3), a diagonal down right mode (mode 4), a vertical right mode (mode 5), a horizontal down mode (mode 6), a vertical left mode (mode 7), and a horizontal up mode (mode 8).

Figure 4:
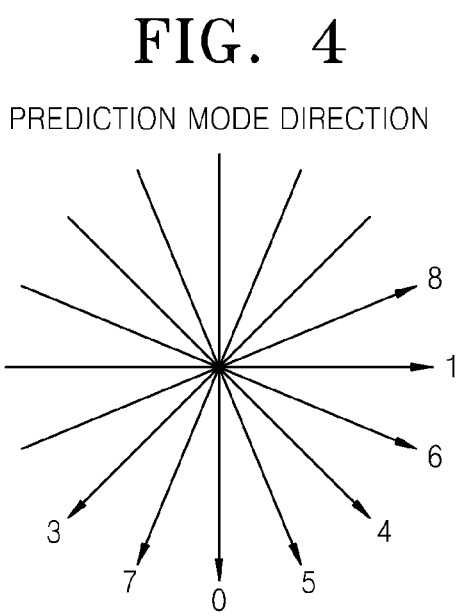
FIG. 4 is a diagram illustrating directions of the intra prediction modes of FIG. 3, according to an exemplary embodiment.

FIG. 4 is a diagram illustrating directions of the intra prediction modes of FIG. 3, according to an exemplary embodiment. In FIG. 4, a numeral shown at an end of an arrow denotes a corresponding mode value when prediction is performed in a direction marked by the arrow. Here, the mode 2 is a DC prediction mode with no directivity, and thus is not shown.

Figure 5:
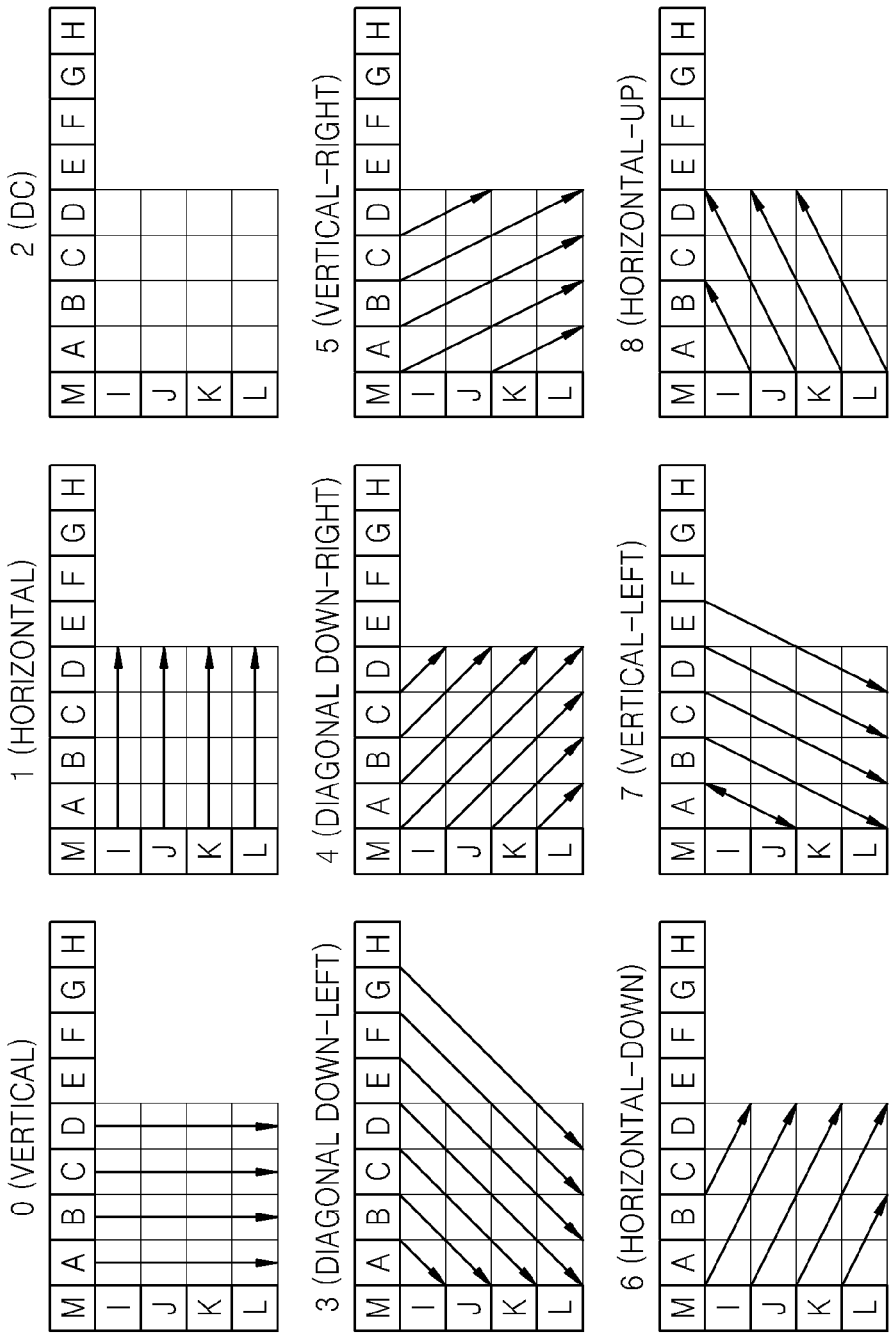
FIG. 5 is a diagram for explaining an intra prediction method performed on the block illustrated in FIG. 3, according to an exemplary embodiment.

FIG. 5 is a diagram for explaining an intra prediction method performed on the block illustrated in FIG. 3, according to an exemplary embodiment.

Referring to FIG. 5, a prediction block is generated by using neighboring pixels A-M of a current block in an available intra prediction mode determined by a size of a block. For example, an operation of prediction-encoding a current block having a size of 4×4 in the mode 0 of FIG. 3, that is, the vertical mode, will be explained. First, pixel values of pixels A through D adjacent above the current block having the size of 4×4 are predicted to be pixel values of the current block having the size of 4×4. That is, a pixel value of the pixel A is predicted to be pixel values of four pixels included in a first column of the current block having the size of 4×4, a pixel value of the pixel B is predicted to be pixel values of four pixels included in a second column of the current block having the size of 4×4, a pixel value of the pixel C is predicted to be pixel values of four pixels included in a third column of the current block having the size of 4×4, and a pixel value of the pixel D is predicted to be pixel values of four pixels included in a fourth column of the current block having the size of 4×4. Next, a residual between actual pixel values of pixels included in the original 4×4 current block and pixel values of pixels included in the 4×4 current block predicted by using the pixels A through D is obtained and encoded.

Figure 6:
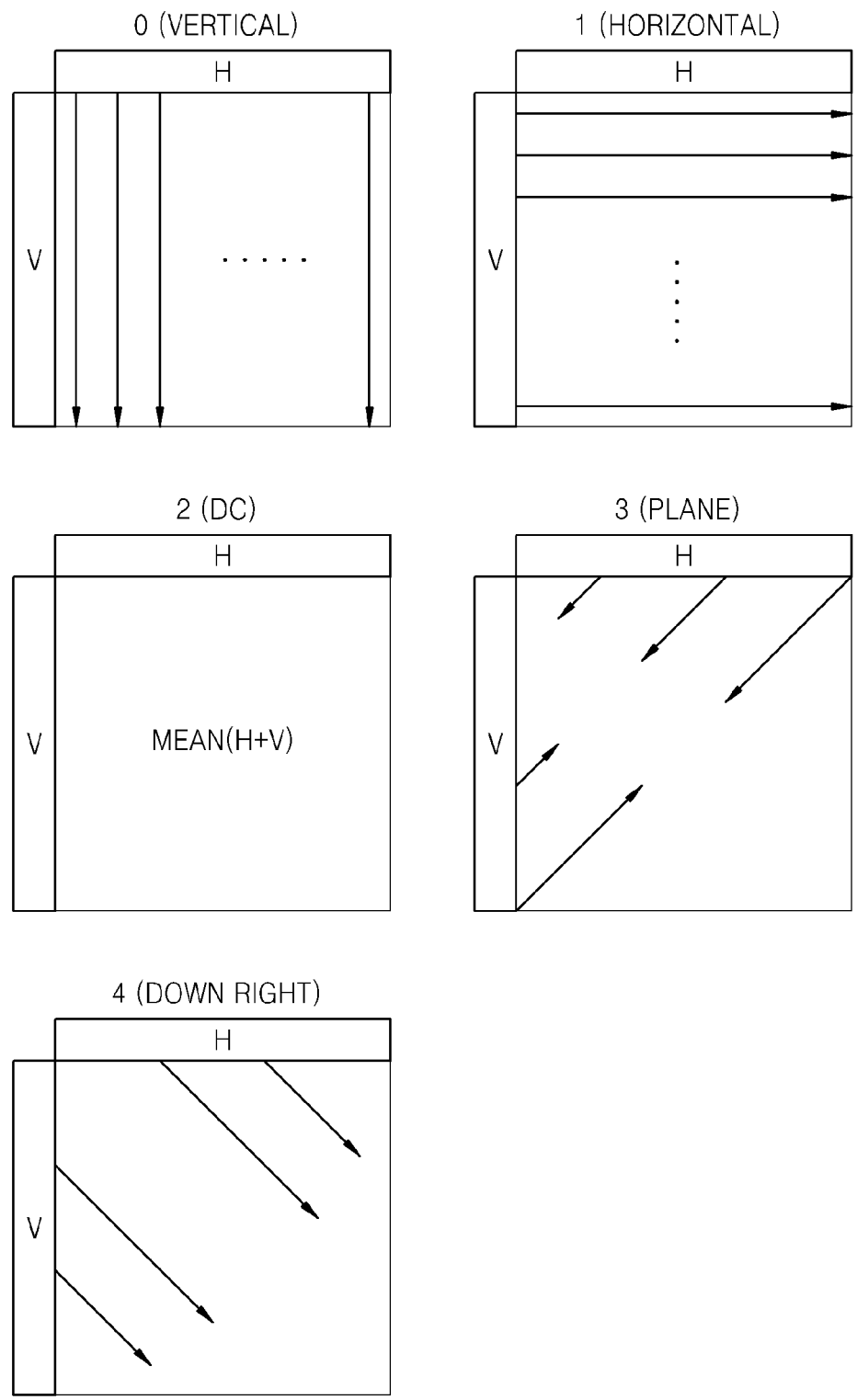
FIG. 6 is a diagram for explaining intra prediction modes applied to a block having a predetermined size, according to another exemplary embodiment.

FIG. 6 is a diagram for explaining intra prediction modes applied to a block having a predetermined size, according to another exemplary embodiment.

Referring to FIGS. 2 and 6, when intra prediction is performed on a block having a size of 2×2 or 128×128, the block having the size of 2×2 or 128×128 may have 5 modes: a vertical mode, a horizontal mode, a DC mode, a plane mode, and a diagonal down right mode.

Meanwhile, if a block having a size of 32×32 includes 33 intra prediction modes as shown in FIG. 2, it is necessary to set directions of the 33 intra prediction modes. In order to set intra prediction modes having various directions other than the intra prediction modes illustrated in FIGS. 4 and 6, a prediction direction for selecting a neighboring pixel to be used as a reference pixel about a pixel in a block is set by using (dx, dy) parameters. For example, when each of the 33 prediction modes is represented as a mode N (N is an integer from 0 to 32), a mode 0 may be set to be a vertical mode, a mode 1 may be set to be a horizontal mode, a mode 2 may be set to be a DC mode, a mode 3 may be set to be a plane mode, and each of a mode 4 through a mode 32 may be set to be a prediction mode having a directivity of $\tan^{-1}(dy/dx)$ represented as one of (dx, dy) that is expressed as one of (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) as shown in Table 1.

TABLE 1

| mode # | dx | dy |
|---|---|---|
| mode 4 | 1 | −1 |
| mode 5 | 1 | 1 |
| mode 6 | 1 | 2 |
| mode 7 | 2 | 1 |
| mode 8 | 1 | −2 |
| mode 9 | 2 | −1 |
| mode 10 | 2 | −11 |
| mode 11 | 5 | −7 |
| mode 12 | 10 | −7 |
| mode 13 | 11 | 3 |
| mode 14 | 4 | 3 |
| mode 15 | 1 | 11 |
| mode 16 | 1 | −1 |
| mode 17 | 12 | −3 |
| mode 18 | 1 | −11 |
| mode 19 | 1 | −7 |
| mode 20 | 3 | −10 |
| mode 21 | 5 | −6 |
| mode 22 | 7 | −6 |
| mode 23 | 7 | −4 |
| mode 24 | 11 | 1 |
| mode 25 | 6 | 1 |
| mode 26 | 8 | 3 |
| mode 27 | 5 | 3 |
| mode 28 | 5 | 7 |
| mode 29 | 2 | 7 |
| mode 30 | 5 | −7 |
| mode 31 | 4 | −3 |

The mode 0 is a vertical mode, the mode 1 is a horizontal mode, the mode 2 is a DC mode, the mode 3 is a plane mode, and the mode 32 is a bilinear mode.

A last mode 32 may be set to be a bilinear mode using bilinear interpolation as will be described later with reference to FIG. 10.

Figure 7:
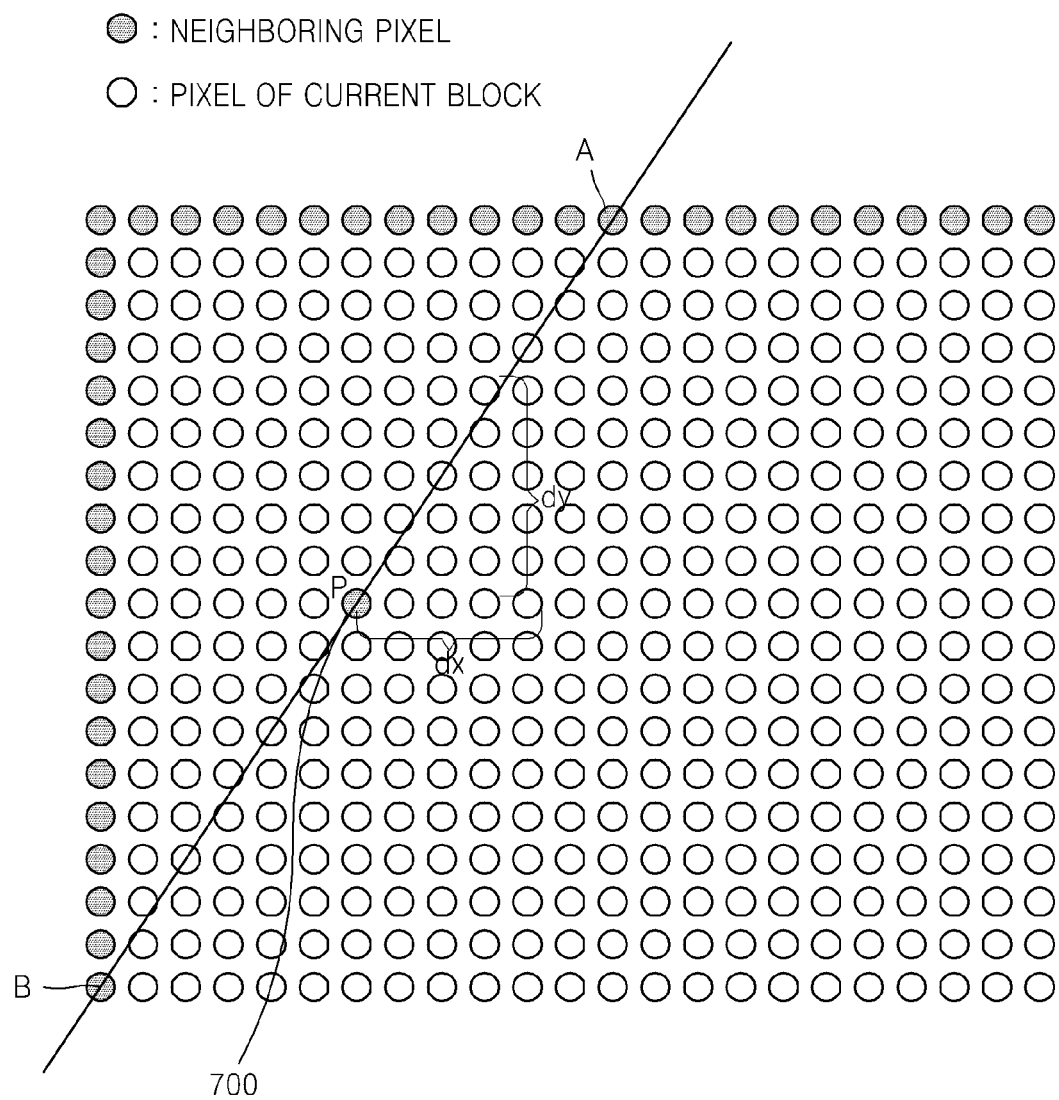
FIG. 7 is a reference diagram for explaining intra prediction modes having various directivities, according to an exemplary embodiment.

FIG. 7 is a reference diagram for explaining intra prediction modes having various directivities, according to an exemplary embodiment.

As described with reference to Table 1, intra prediction modes may have various directivities of $\tan^{-1}(dy/dx)$ by using a plurality of (dx, dy) parameters.

Referring to FIG. 7, neighboring pixels A and B located on an extended line 700 having a gradient of $\tan^{-1}(dy/dx)$ that is determined according to (dx, dy) of each mode shown in Table 1 about a current pixel P to be predicted in a current block may be used as a predictor for the current pixel P. In this case, it is preferable that the neighboring pixels A and B used as a predictor are pixels of neighboring block at up, left, right up, and left down sides of the current block, which are previously encoded and restored. Also, if the extended line 700 passes between, not through, neighboring pixels of integer locations, neighboring pixels closer to the current pixel P from among neighboring pixels close to the extended line 700 may be used as a predictor, or prediction may be performed by using neighboring pixels close to the extended line 700. For example, an average value between neighboring pixels close to the extended line 700, or a weighted average value considering a distance between an intersection of the extended line 700 and neighboring pixels close to the extended line 700 may be used as a predictor for the current pixel P. Also, as shown in FIG. 7, it may be signaled in units of blocks which neighboring pixels, e.g., the neighboring pixels A and B, are to be used as a predictor for the current pixel P from among neighboring pixels on an X-axis and neighboring pixels on a Y-axis which are available according to prediction directions.

Figure 8:
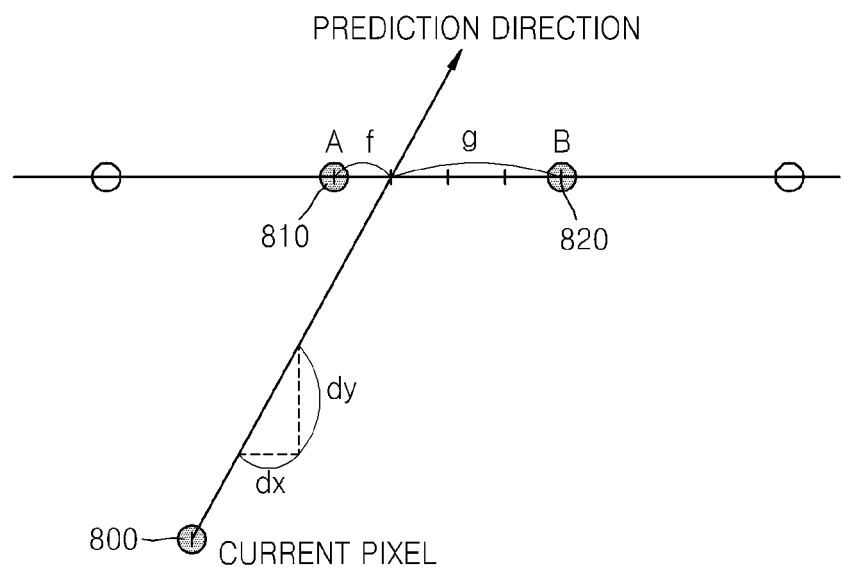
FIG. 8 is a reference diagram for explaining a process of generating a predictor when an extended line having a predetermined gradient passes between, not through, neighboring pixels of integer locations, according to an exemplary embodiment.

FIG. 8 is a reference diagram for explaining a process of generating a predictor when an extended line 800 having a predetermined gradient passes between, not through, neighboring pixels of integer locations, according to an exemplary embodiment.

Referring to FIG. 8, if the extended line 800 having an angle of $\tan^{-1}(dy/dx)$ that is determined according to (dx, dy) of each mode passes between a neighboring pixel A 810 and a neighboring pixel B 820 of integer locations, a weighted average value considering a distance between an intersection of the extended line 800 and the neighboring pixels A 810 and B 820 close to the extended line 800 may be used as a predictor for the current pixel P as described above. For example, when a distance between the intersection of the extended line 800 having the angle of $\tan^{-1}(dy/dx)$ and the neighboring pixel A 810 is f and a distance between the intersection of the extended line 800 and the neighboring pixel B 820 is g, a predictor for the current pixel P may be obtained as (A*g+B*f)/(f+g). Here, it is preferable that f and g may be each a normalized distance using an integer. If software or hardware is used, the predictor for the current pixel P may be obtained by shift operation as (g*A+f*B+2)>>2. As shown in FIG. 8, if the extended line 800 passes through a first quarter close to the neighboring pixel A 810 from among four parts obtained by quartering a distance between the neighboring pixel A 810 and the neighboring pixel B 820 of the integer locations, the predictor for the current pixel P may be obtained as (3*A+B)/4. Such operation may be performed by shift operation considering rounding off to a nearest integer like (3*A+B+2)>>2.

Figure 9:
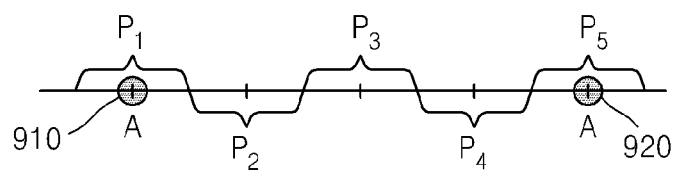
FIG. 9 is a reference diagram for explaining a process of generating a predictor when an extended line having a predetermined gradient passes between neighboring pixels of integer locations, according to another exemplary embodiment.

FIG. 9 is a reference diagram for explaining a process of generating a predictor when an extended line having a predetermined gradient passes between neighboring pixels of integer locations, according to another exemplary embodiment.

Referring to FIG. 9, if an extended line having an angle of $\tan^{-1}(dy/dx)$ that is determined according to (dx, dy) of each mode passes between a neighboring pixel A 910 and a neighboring pixel B 920 of integer locations, a section between the neighboring pixel A 910 and the neighboring pixel B 920 may be divided into a predetermined number of areas, and a weighted average value considering a distance between an intersection and the neighboring pixel A 910 and the neighboring pixel B 920 in each divided area may be used as a prediction value. For example, a section between the neighboring pixel A 910 and the neighboring pixel B 920 may be divided into five sections P1 through P5 as shown in FIG. 9, a representative weighted average value considering a distance between an intersection and the neighboring pixel A 151 and the neighboring pixel B 152 in each section may be determined, and the representative weighted average value may be used as a predictor for the current pixel P. In detail, if an extended line passes through the section P1, a value of the neighboring pixel A 910 may be determined as a predictor for the current pixel P. If an extended line passes through the section P2, a weighted average value (3*A+1*B+2)>>2 considering a distance between the neighboring pixel A 910 and the neighboring pixel 920 and a middle point of the section P2 may be determined as a predictor for the current pixel P. If an extended line passes through the section P3, a weighted average value (2*A+2*B+2)>>2 considering a distance between the neighboring pixel A 910 and the neighboring pixel B 920 and a middle point of the section P3 may be determined as a predictor for the current pixel P. If an extended line passes through the section P4, a weighted average value (1*A+3*B+2)>>2 considering a distance between the neighboring pixel A 910 and the neighboring pixel B 920 and a middle point of the section P4 may be determined as a predictor for the current pixel P. If an extended line passes through the section P5, a value of the neighboring pixel B 920 may be determined as a predictor for the current pixel P.

Also, if two neighboring pixels, that is, the neighboring pixel A on the up side, and the neighboring pixel B on the left side meet the extended line 700 as shown in FIG. 7, an average value of the neighboring pixel A and the neighboring pixel B may be used as a predictor for the current pixel P. Alternatively, if (dx*dy) is a positive value, the neighboring pixel A on the up side may be used, and if (dx*dy) is a negative value, the neighboring pixel B on the left side may be used.

It is preferable that intra prediction modes having various directivities, as shown in Table 1, are previously set at an encoding end and a decoding end, and only a corresponding index of an intra prediction mode set for each block is transmitted.

Figure 10:
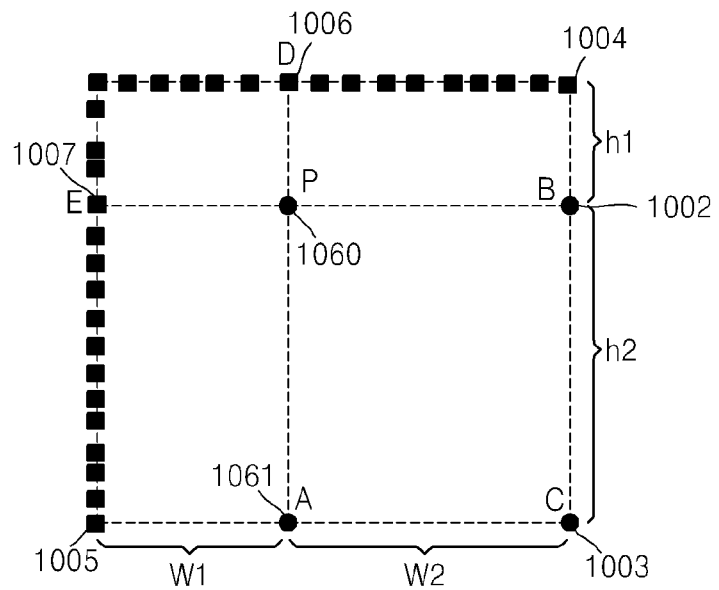
FIG. 10 is a reference diagram for explaining a bilinear mode according to an exemplary embodiment.

FIG. 10 is a reference diagram for explaining a bilinear mode according to an exemplary embodiment.

Referring to FIG. 10, in a bilinear mode, a geometric average value considering distances to up, down, left, and right borders of the current pixel P and pixels located at the up, down, left, and right borders about the current pixel P to be predicted in a current block is calculated, and a result of the calculation is used as a predictor for the current pixel P. That is, in a bilinear mode, a geometric average value of distances to up, down, left, and right borders of the current pixel P and a pixel A 1061, a pixel B 1002, a pixel D 1006, and a pixel E 1007 which are located at the up, down, left, and right borders of the current pixel P may be used as a predictor for the current pixel P 1060. In this case, since the bilinear mode is one of intra prediction modes, neighboring pixels on up and left sides which are previously encoded and then restored should also be used as reference pixels during prediction. Accordingly, corresponding pixel values in the current block are not used as the pixel A 1061 and the pixel B 1002, but virtual pixel values generated by using neighboring pixels on up and sides are used.

In detail, a virtual pixel C 1003 at a right down side of a current block is calculated by using an average value of a neighboring pixel RightUpPixel 1004 at a right up side and a neighboring pixel LeftDownPixel 1005 at a left down side adjacent to the current block as shown in Equation 1.

$$C=0.5(\text{DownPixel}+\text{UpPixel}) \quad [\text{Equation 1}]$$

Equation 1 may be calculated by shift operation as C=0.5 (LeftDownPixel+RightUpPixel+1)>>1.

When the current pixel P 1060 is extended downward by considering a distance W1 to the left border and a distance W2 to the right border of the current pixel P 1060, a value of the virtual pixel A 1061 located on the down border may be set by using an average value of the neighboring pixel LeftDownPixel 1005 at a left down side and the pixel C 1003. For example, the value of the pixel A 1061 may be calculated by using one equation shown in Equation 2.

$$A=(C*W1+\text{DownPixel}*W2)/(W1+W2)$$

$$A=(C*W1+\text{DownPixel}*W2+((W1+W2)/2))/(W1+W2); \quad [\text{Equation 2}]$$

In Equation 2, when a value of W1+W2 is a power of 2 like $2^n$, A=(C*W1+LeftDownPixel*W2+((W1+W2)/2))/(W1+W2) may be calculated by shift operation as A=(C*W1+LeftDownPixel*W2+2^(n−1))>>n without division.

Likewise, when the current pixel P 1060 is extended rightward by considering a distance h1 to the upper border of the current pixel P 1060 and a distance h2 to the lower border of the current pixel P 1060, a value of a virtual pixel B 1002 located on the right border may be set by using an average value of the neighboring pixel RightUpPixel 1004 on a right up side and the pixel C 1003 by considering the distances h1 and h2. For example, the value of the pixel B 1002 may be calculated by using one equation shown in Equation 3.

$$B=(C*h1+\text{UpPixel}*h2)/(h1+h2);$$

$$B=(C*h1+\text{UpPixel}*h2+((h1+h2)/2))/(h1+h2)$$

In Equation 3, when a value of h1+h2 is a power of 2 like 2^m, B=(C*h1+RightUpPixel*h2+((h1+h2)/2))/(h1+h2) may be calculated by shift operation as B=(C*h1+RightUpPixel*h2+2^(m−1))>>m without a division.

Once the values of the virtual pixel A 1061 on the down border of the current pixel P 1060 and the virtual pixel B 1002 on the right border of the current pixel P 1060 are determined by using Equations 1 through 3, a predictor for the current pixel P 1060 may be determined by using an average value of A+B+D+E. In detail, a weighted average value considering a distance between the current pixel P 1060 and the virtual pixel A 1061, the virtual pixel B 1002, the pixel D 1006, and the pixel E 1007, or an average value of A+B+D+E may be used as a predictor for the current pixel P 1060. For example, if a size of a block of FIG. 10 is 16×16 and a weighted average value is used, a predictor for the current pixel P 1060 may be obtained as (h1*A+h2*D+W1*B+W2*E+16)>>5. As such, such bilinear prediction is applied to all pixels in a current block, and a prediction block of the current block in a bilinear prediction mode is generated.

Since prediction encoding is performed according to intra prediction modes that vary according to a size of a block, more efficient compression may be achieved according to characteristics of an image.

Meanwhile, since a greater number of intra prediction modes than intra prediction modes used in a conventional codec are used according to the present exemplary embodiment, compatibility with the conventional codec may become a problem. Accordingly, it may be necessary to map available intra prediction modes having various directions to one of a smaller number of intra prediction modes. That is, when a number of available intra prediction modes of a current block is N1 (N1 is an integer), in order to make the available intra prediction modes of the current block compatible with a block having N2 (N2 is an integer different from N1) intra prediction modes, the intra prediction modes of the current block may be mapped to an intra prediction mode having a most similar direction from among the N2 intra prediction modes. For example, it is assumed that a total of 33 intra prediction modes are available in the current block as shown in Table 1 and an intra prediction mode finally applied to the current block is the mode 14, that is, (dx, dy)=(4,3), having a directivity of tan⁻¹(¾)≈36.87(degrees). In this case, in order to match the intra prediction mode applied to the current block to one of 9 intra prediction modes as shown in FIG. 4, the mode 4 (down right) having a most similar directivity to the directivity of 36.87 (degrees) may be selected. That is, the mode 14 in Table 1 may be mapped to the mode 4 illustrated in FIG. 4. Likewise, if an intra prediction mode applied to the current block is selected to be the mode 15, that is, (dx, dy)=(1,11), from among the 33 available intra prediction modes of Table 1, since a directivity of the intra prediction mode applied to the current block is tan⁻¹(11)≈84.80 (degrees), the mode 0 (vertical) of FIG. 4 having a most directivity to the directivity of 84.80 (degrees) may be mapped to the mode 15.

Meanwhile, in order to decode a block encoded through intra prediction, prediction mode information about through which intra prediction mode a current block is encoded is required. Accordingly, when an image is encoded, information about an intra prediction mode of a current block is added to a bitstream, and at this time, if the information about the intra prediction mode is added as it is to the bitstream for each block, overhead is increased, thereby reducing compression efficiency. Accordingly, the information about the intra prediction mode of the current block that is determined as a result of encoding of the current block may not be transmitted as it is, but only a difference value between a value of an actual intra prediction mode and a prediction value of an intra prediction mode predicted from neighboring blocks may be transmitted.

Figure 14:
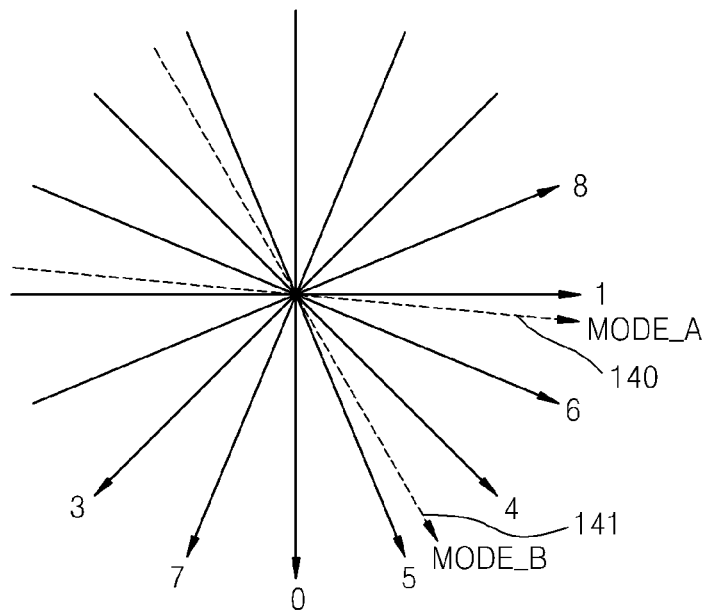
FIG. 14 is a reference diagram for explaining a process of mapping intra prediction modes of a neighboring block to one of representative intra prediction modes, according to an exemplary embodiment.

If intra prediction modes having various directions are used according to the present exemplary embodiment, a number of available intra prediction modes may vary according to a size of a block. Accordingly, in order to predict an intra prediction mode of a current block, it is necessary to map intra prediction modes of neighboring blocks to representative intra prediction modes. Here, it is preferable that the representative intra prediction modes may be a smaller number of intra prediction modes from among intra prediction modes of available neighboring blocks, or 9 intra prediction modes as shown in FIG. 14.

Figure 11:
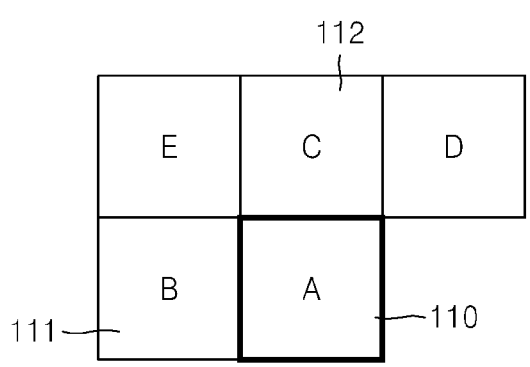
FIG. 11 is a diagram for explaining a process of generating a prediction value of an intra prediction mode of a current block, according to an exemplary embodiment.

FIG. 11 is a diagram for explaining a process of generating a prediction value of an intra prediction mode of a current block, according to an exemplary embodiment.

Referring to FIG. 11, when a current block is A 110, an intra prediction mode of the current block A 110 may be predicted from intra prediction modes determined from neighboring blocks. For example, if a determined intra prediction mode determined from a left block B 111 of the current block A 110 is a mode 3 and an intra prediction mode determined from an up block C 112 is a mode 4, an intra prediction mode of the current block A 110 may be predicted to be the mode 3 having a smaller value from among the prediction modes of the up block C 112 and the left block B 111. If an intra prediction mode determined as a result of actual intra prediction encoding performed on the current block A 110 is a mode 4, only a difference 1 from the mode 3 that is a value of the intra prediction mode predicted from the neighboring blocks B 111 and C 112 is transmitted as intra prediction mode information. When an image is decoded, in the same manner, a prediction value of an intra prediction mode of a current block is generated, a mode difference value transmitted through a bitstream is added to the prediction value of the intra prediction mode, and intra prediction mode information actually applied to the current block is obtained. Although only the neighboring blocks located on the upper and left sides of the current block are used, an intra prediction mode of the current block A 110 may be predicted by using other neighboring blocks as shown in FIG. 11E and FIG. 11D.

Meanwhile, since intra prediction modes actually performed vary according to a size of a block, an intra prediction mode predicted from neighboring blocks may not be matched to an intra prediction mode of a current block. Accordingly, in order to predict an intra prediction mode of a current block from neighboring blocks having different sizes, a mapping process of unifying intra prediction modes of the blocks having different intra prediction modes is required.

Figure 12:
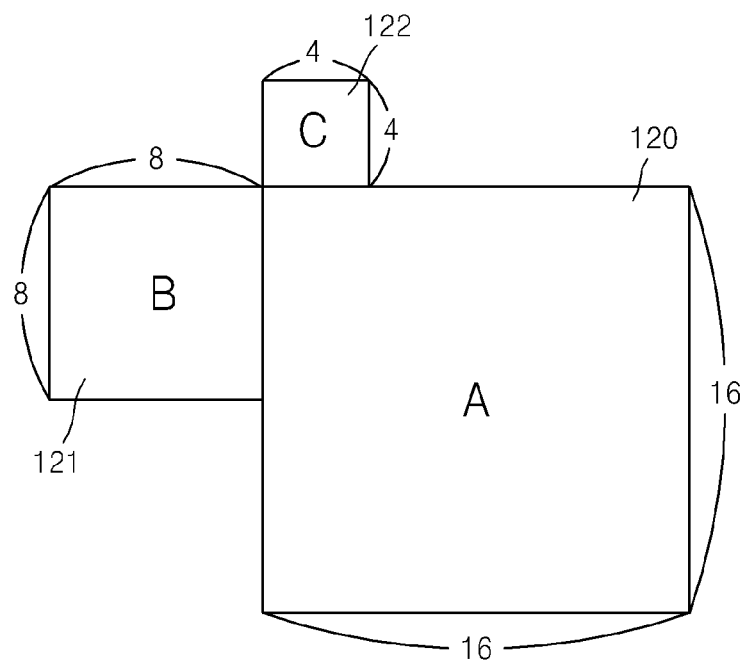
FIGS. 12 and 13 are reference diagrams for explaining a mapping process for unifying intra prediction modes of blocks having different sizes, according to exemplary embodiments.
Figure 13:
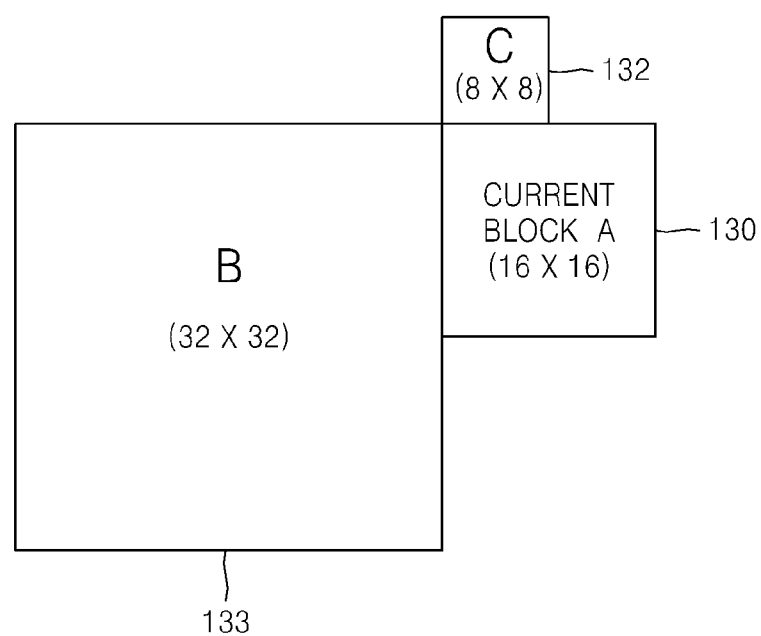

FIGS. 12 and 13 are reference diagrams for explaining a mapping process for unifying intra prediction modes of blocks having different sizes, according to exemplary embodiments.

Referring to FIG. 12, it is assumed that a current block A 120 has a size of 16×16, a left block B 121 has a size of 8×8, and an upper block C 122 has a size of 4×4. Also, as shown in Example 1 of FIG. 2, it is assumed that numbers of available intra prediction modes of the blocks having the sizes of 4×4, 8×8, and 16×16 are 9, 9, and 33. In this case, since the numbers of the available intra prediction modes of the left block B 121 and the upper block C 122 are different from the number of the available intra prediction modes of the current block A 120, an intra prediction mode predicted from the left block B 121 and the up block C 122 is not suitable to be used as a prediction value of an intra prediction mode of the current block A 120. Accordingly, in FIG. 12, intra prediction modes of the neighboring block B 121 and the neighboring block C 122 are respectively changed to first and second representative intra prediction modes having a most similar direction from among a predetermined number of representative intra prediction modes as shown in FIG. 14, and a mode having a smaller mode value is selected from the first and second representative intra prediction modes as a final representative intra prediction mode. An intra prediction mode having a most similar direction to the final representative intra prediction mode selected from the intra prediction modes available according to a size of the current block A 120 is predicted to be an intra prediction mode of the current block A 120.

Alternatively, referring to FIG. 13, it is assumed that a current block A 130 has a size of 16×16, a left block B 133 has a size of 32×32, and an upper block C 132 has a size of 8×8. Also, as shown in Example 1 of FIG. 2, it is assumed that numbers of available intra prediction modes of the blocks having the sizes of 8×8, 16×16, and 32×32 are 9, 9, and 32. Also, it is assumed that an intra prediction mode of the left block B 133 is a mode 4, and an intra prediction mode of the upper block C 132 is a mode 31. In this case, since the intra prediction modes of the left block B 133 and the up block C 132 are not compatible with each other, each of the intra prediction modes of the left block B 133 and the upper block C 132 is mapped to one of representative intra prediction modes, as shown in FIG. 14. Since the mode 31 that is the intra prediction mode of the left block B 133 has a directivity of (dx, dy)=(4, −3) as shown in Table 1, the mode 31 is mapped to a mode 5 having a most similar directivity to $\tan^{-1}(-3/4)$ from among the representative intra prediction modes of FIG. 14, and since the mode 4 has the same directivity as that of a mode 4 from among the representative intra prediction modes of FIG. 14, the mode 4 that is the intra prediction mode of the upper block C 132 is mapped to the mode 4.

Next, the mode 4 having a smaller mode value from among the mode 5 that is the mapped intra prediction mode of the left block B 133 and the mode 4 that is the mapped intra prediction mode of the up block C 132 may be determined to be a prediction value of an intra prediction mode of the current block A 130, and only a mode difference value between an actual intra prediction mode and a predicted intra prediction mode of the current block A 130 may be encoded as prediction mode information of the current block A 130.

FIG. 14 is a reference diagram for explaining a process of mapping intra prediction modes of neighboring blocks to one of representative intra prediction modes, according to an exemplary embodiment. In FIG. 14, as representative intra prediction modes, a vertical mode 0, a horizontal mode 1, a DC mode (not shown), a diagonal down left mode 3, a diagonal down right mode 4, a vertical right mode 5, a horizontal down mode 6, a vertical left mode 7, and a horizontal up mode 8 are set. However, the representative intra prediction modes are not limited thereto and may be set to have a various number of directivities.

Referring to FIG. 14, a predetermined number of representative intra prediction modes are previously set, and intra prediction modes of neighboring blocks are mapped to a representative intra prediction mode having a most similar direction. For example, if a determined intra prediction mode of a neighboring block is an intra prediction mode MODE_A 140 having a directivity, the intra prediction mode MODE_A 140 of the neighboring block is mapped to MODE 1 having a most similar direction from among 9 preset representative intra prediction modes 1 through 9. If a determined prediction mode of a neighboring block is an intra prediction mode MODE_B 141 having a directivity, the intra prediction mode MODE_B 141 of the neighboring block is mapped to MODE 5 having a most similar direction from among the 9 preset representative intra prediction modes 1 through 9.

As such, if available intra prediction modes of neighboring blocks are not the same, the intra prediction modes of the neighboring blocks are mapped to representative intra prediction modes, and an intra prediction mode having a smallest mode value is selected as a final representative intra prediction mode of the neighboring blocks from among the mapped intra prediction modes of the neighboring blocks. As such, the reason why a representative intra prediction mode having a smaller mode value is that a smaller mode value is set to more often generated intra prediction modes. That is, if different intra prediction modes are predicted from neighboring blocks, since an intra prediction mode having a smaller mode value has a higher occurrence possibility, it is preferable to select a prediction mode having a smaller mode value as a predictor for a prediction mode of a current block when there are different prediction modes.

Sometimes, although a representative intra prediction mode is selected from neighboring blocks, the representative intra prediction mode may not be used as the representative intra prediction mode is as a predictor for an intra prediction mode of a current block. For example, if the current block A 120 has 33 intra prediction modes and a representative intra prediction mode has only 9 representative intra prediction modes, as described with reference to FIG. 12, an intra prediction mode of the current block A 120 corresponding to a representative intra prediction mode does not exist. In this case, in a similar manner to that used to map intra prediction modes of neighboring blocks to a representative intra prediction mode as described above, an intra prediction mode having a most similar direction to a representative intra prediction mode selected from available intra prediction modes according to a size of a current block may be selected as a final predictor for an intra prediction mode of the current block. For example, if a representative intra prediction mode finally selected from neighboring blocks in FIG. 14 is a mode 6, an intra prediction mode having a most similar directivity to that of the mode 6 from among intra prediction modes available according to the size of the current block may be finally selected as a predictor for the intra prediction mode of the current block.

Meanwhile, as described above with reference to FIG. 7, if a predictor for the current pixel P is generated by using neighboring pixels on or close to the extended line 700, the extended line 700 has actually a directivity of $\tan^{-1}(dy/dx)$. Since division (dy/dx) is needed in order to calculate the directivity, when hardware or software is used, calculation is made down to decimal places, thereby increasing the amount of calculation. Accordingly, it is preferable that when a prediction direction for selecting neighboring pixels to be used as reference pixels about a pixel in a block is set by using (dx, dy) parameters in a similar manner to that described with reference to Table 1, dx and dy are set to reduce the amount of calculation.

Figure 15:
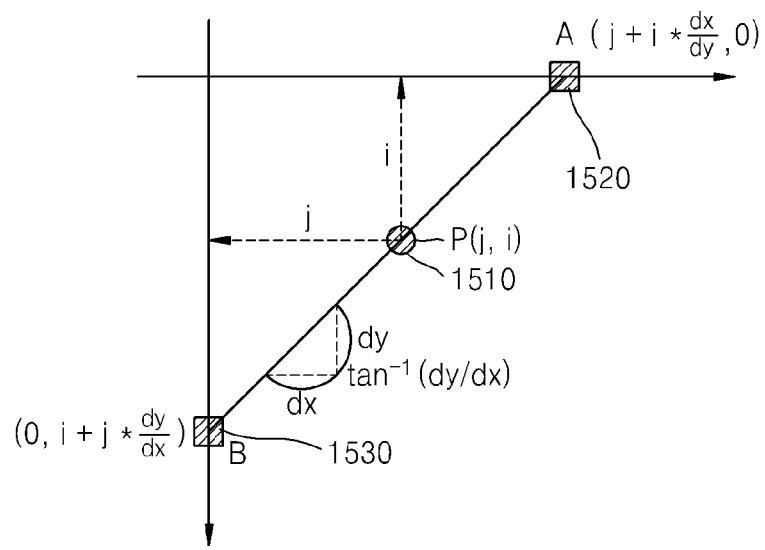
FIG. 15 is a diagram for explaining a relationship between a current pixel and neighboring pixels located on an extended line having a directivity (dx, dy), according to an exemplary embodiment.

FIG. 15 is a diagram for explaining a relationship between a current pixel and neighboring pixels located on an extended line having a directivity of (dx, dy), according to an exemplary embodiment.

Referring to FIG. 15, it is assumed that a location of a current pixel P 1510 located on an ith place (i is an integer) based on an up border of a current block and a jth place (j is an inter) based on a left border of the current block is P(j,i), and an upper neighboring pixel and a left neighboring pixel located on an extended line passing through the current pixel P 1510 and having a directivity, that is, a gradient, of $\tan^{-1}$ (dy/dx) are respectively A 1520 and B 1530. Also, when it is assumed that locations of up neighboring pixels correspond to an X-axis on a coordinate plane and locations of left neighboring pixels correspond to a Y-axis on the coordinate plate, it is found by using a trigonometric ratio that the upper neighboring pixel A 1520 meeting the extended line is located on (j+i*dx/dy,0) and the left neighboring pixel B 1530 meeting the extended line is located on (0,i+j*dy/dx). Accordingly, to determine any one of the up neighboring pixel A 1520 and the left neighboring pixel B 1530 for predicting the current pixel P 1510, division, such as dx/dy or dy/dx, is required. Since division is very complex as described above, a calculation speed of software or hardware may be reduced.

Accordingly, a value of at least one of dx and dy representing a directivity of a prediction mode for determining neighboring pixels used for intra prediction may be determined to be a power of 2. That is, when n and m are integers, dx and dy may be respectively $2^n$ and $2^m$.

Referring to FIG. 15, if the left neighboring pixel B 1530 is used as a predictor for the current pixel P 1510 and dx has a value of $2^n$, j*dy/dx needed to determine (0,i+j*dy/dx) that is a location of the left neighboring pixel B 1530 becomes (i*dy)/($2^n$), and division using such a power of 2 is easily obtained by shift operation as (i*dy)>>n thereby reducing the amount of calculation.

Likewise, if the up neighboring pixel A 1520 is used as a predictor for the current pixel P 1510 and dy has a value of $2^m$, i*dx/dy needed to determine (j+i*dx/dy,0) that is a location of the up neighboring pixel A 1520 becomes (i*dx)/($2^m$), and division using such a power of 2 is easily obtained by shift operation as (i*dx)>>m.

Figure 16:
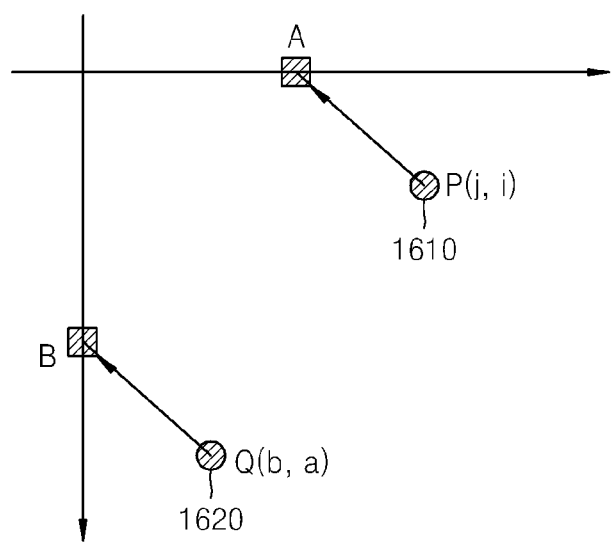
FIG. 16 is a diagram for explaining a change in a neighboring pixel located on an extended line having a directivity (dx, dy) according to a location of a current pixel, according to an exemplary embodiment.

FIG. 16 is a diagram for explaining a change in a neighboring pixel located on an extended line having a directivity of (dx, dy) according to a location of a current pixel, according to an exemplary embodiment.

One of an up neighboring pixel and a left neighboring pixel located on an extended line passing through a current pixel is selected as a neighboring pixel necessary for prediction according to a location of the current pixel and a gradient of the extended line.

Referring to FIG. 16, when a current pixel 1610 is P(j,i) and is predicted by using a neighboring pixel located on an extended line having a gradient, an upper pixel A is used to predict the current pixel P 1610. When a current pixel 1620 is Q(b,a), a left pixel B is used to predict the current pixel Q 1620.

If only a dy component of a Y-axis direction from among (dx, dy) representing a prediction direction has a power of 2 like $2^m$, the upper pixel A in FIG. 16 may be determined by shift operation or the like as (j+(i*dx)>>m, 0) without division, but the left pixel B requires division as shown in (0, a+b*$2^m$/dx). Accordingly, in order to exclude division when a predictor is generated for all pixels of a current block, all of dx and dy should have a type of power of 2.

Figure 17:
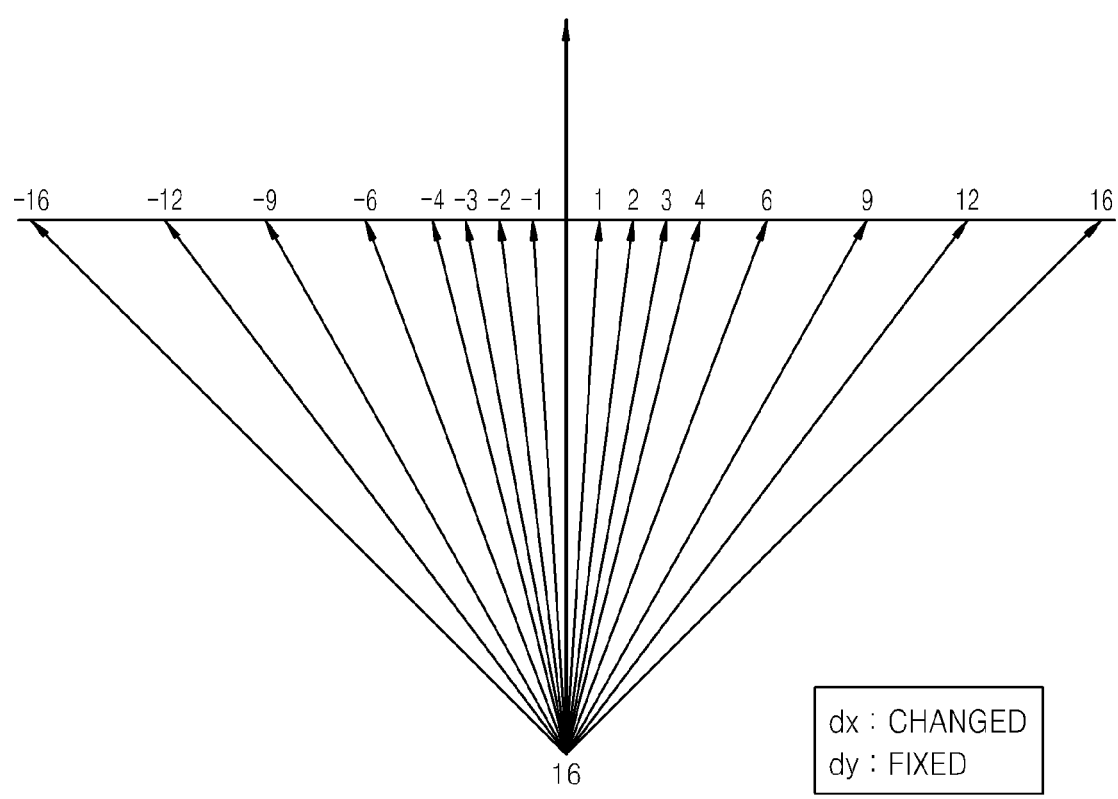
FIGS. 17 and 18 are diagrams for explaining a method of determining an intra prediction mode direction, according to exemplary embodiments.
Figure 18:
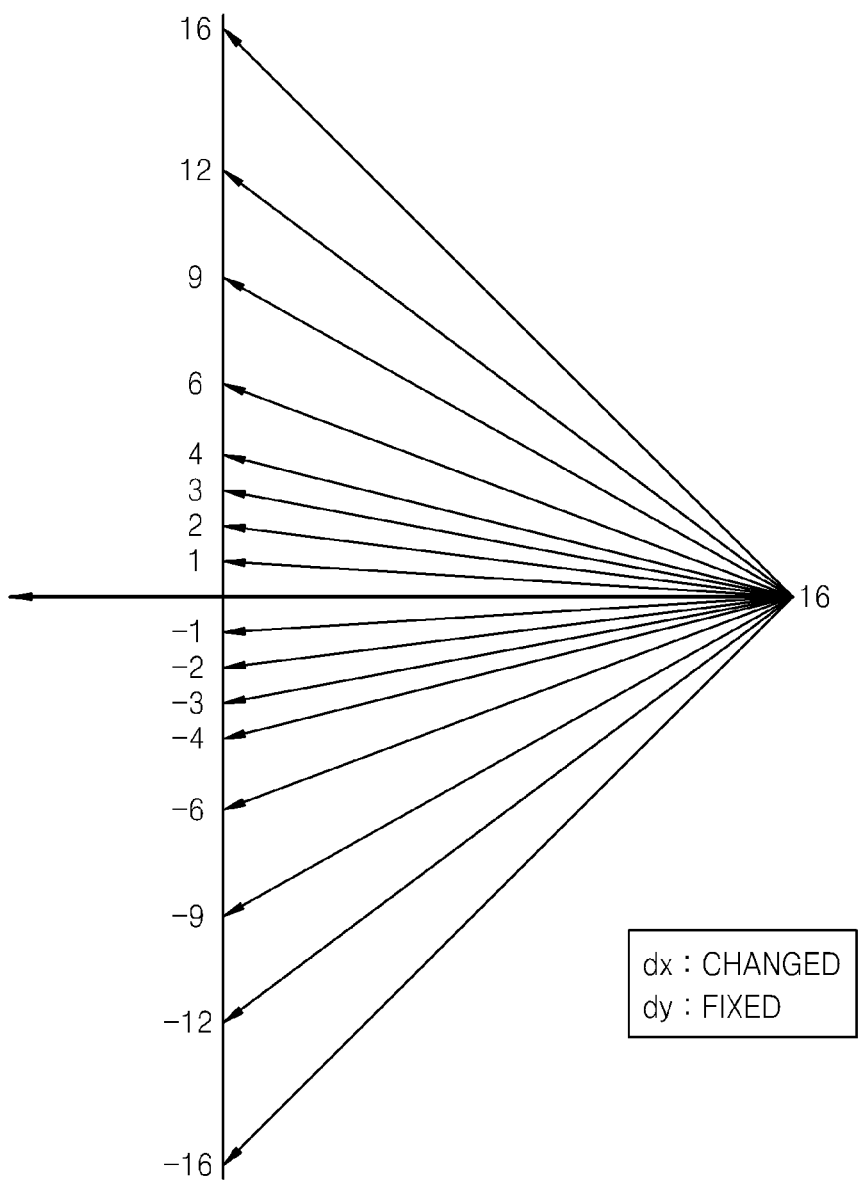

FIGS. 17 and 18 are diagrams for explaining a method of determining an intra prediction mode direction, according to exemplary embodiments.

In general, there are many cases where linear patterns shown in an image or a video signal are vertical or horizontal. Accordingly, when intra prediction modes having various directivities are defined by using (dx, dy) parameters, image coding efficiency may be improved by defining values of dx and dy. For example, an absolute values of dx and dy are set such that a distance between prediction directions close to a horizontal direction or a vertical direction is narrow and a distance between prediction modes close to a diagonal direction is wide.

In detail, referring to FIG. 17, if dy has a fixed value of $2^n$, an absolute value of dx may be set such that a distance between prediction directions close to a vertical direction is narrow and a distance between prediction modes closer to a horizontal direction is wider. In other words, an absolute value of dx may be set such that a distance between prediction directions close to a vertical direction is narrow and a distance between prediction modes closer to a diagonal (+45 or −45 degree) direction is wider. That is, if dy has a fixed value that is a power of 2, a distance may be set to decrease as an absolute value of dx is closer to 0 such that the distance decreases as a direction of an extended line is closer to a vertical direction, and the distance may be set to increase as the absolute value of dx is farther from 0 such that the distance increases as the direction of the extended line is closer to a horizontal direction. For example, as shown in FIG. 17, if dy has a value of $2^4$, that is, 16, a value of dx may be set to be 1, 2, 3, 4, 6, 9, 12, 16, 0, −1, −2, −3, −4, −6, −9, −12, and −16, such that a distance between extended lines close to a vertical direction may be narrow and a distance between extended lines close to a horizontal direction may be wide.

Likewise, when dx has a fixed value of $2^n$, an absolute value of dy may be set such that a distance between prediction directions close to a horizontal direction is narrow and a distance between prediction modes closer to a vertical direction is wider. In other words, an absolute value of dy may be set such that a distance between prediction directions close to a horizontal direction is narrow and a distance between prediction modes closer to a diagonal (+45 or −45 degree) direction is wider. That is, when dx has a fixed value that is a power of 2, a distance may be set to be reduced as an absolute value of dy is closer to 0 such that the distance decreases as a direction of an extended line is closer to a horizontal direction, and the distance may be set to increase as an absolute value of dy is farther from 0 such that the distance increases as the direction of the extended line is closer to the horizontal direction. For example, as shown in FIG. 18, when dx has a value of $2^4$, that is, 16, a value of dy may be set to be 1, 2, 3, 4, 6, 9, 12, 16, 0, −1, −2, −3, −4, −6, −9, −12, and −16 such that a distance between extended lines close to a horizontal direction may be narrow and a distance between extended lines close to a vertical direction may be wide.

Also, when a value of any one of dx and dy is fixed, a value of the remaining one may be set to be increased according to a prediction mode. In detail, when dy is fixed, a distance between dxs may be set to increase by a predetermined value. For example, if a value of dy is fixed to 16, dx may be set such that an absolute value difference between different dxs is increased by 1, like 0, 1, 3, 6, and 8. Also, an angle between a horizontal direction and a vertical direction may be divided in predetermined units, and such an increased amount may be set in each of the divided angles. For example, if dy is fixed, a value of dx may be set to have an increased amount of 'a' in a section less than 15 degrees, an increased amount of 'b' in a section between 15 degrees and 30 degrees, and an increased amount of 'c' in a section greater than 30 degrees. In this case, in order to have such a shape as shown in FIG. 17, the value of dx may be set to satisfy a relationship of a≤b≤c.

Prediction modes described with reference to FIGS. 15 through 18 may be defined as a prediction mode having a directivity of $\tan^{-1}(dy/dx)$ by using (dx, dy) as shown in Table 2 through Table 4.

TABLE 2

| dx | dy | dx | dy | dx | dy |
|---|---|---|---|---|---|
| −32 | 32 | 21 | 32 | 32 | 13 |
| −26 | 32 | 26 | 32 | 32 | 17 |
| −21 | 32 | 32 | 32 | 32 | 21 |
| −17 | 32 | 32 | −26 | 32 | 26 |
| −13 | 32 | 32 | −21 | 32 | 32 |
| −9 | 32 | 32 | −17 | | |
| −5 | 32 | 32 | −13 | | |
| −2 | 32 | 32 | −9 | | |
| 0 | 32 | 32 | −5 | | |
| 2 | 32 | 32 | −2 | | |
| 5 | 32 | 32 | 0 | | |
| 9 | 32 | 32 | 2 | | |
| 13 | 32 | 32 | 5 | | |
| 17 | 32 | 32 | 9 | | |

TABLE 3

| dx | dy | dx | dy | dx | dy |
|---|---|---|---|---|---|
| −32 | 32 | 19 | 32 | 32 | 10 |
| −25 | 32 | 25 | 32 | 32 | 14 |
| −19 | 32 | 32 | 32 | 32 | 19 |
| −14 | 32 | 32 | −25 | 32 | 25 |
| −10 | 32 | 32 | −19 | 32 | 32 |
| −6 | 32 | 32 | −14 | | |
| −3 | 32 | 32 | −10 | | |
| −1 | 32 | 32 | −6 | | |
| 0 | 32 | 32 | −3 | | |
| 1 | 32 | 32 | −1 | | |
| 3 | 32 | 32 | 0 | | |
| 6 | 32 | 32 | 1 | | |
| 10 | 32 | 32 | 3 | | |
| 14 | 32 | 32 | 6 | | |

TABLE 4

| dx | dy | dx | dy | dx | dy |
|---|---|---|---|---|---|
| −32 | 32 | 23 | 32 | 32 | 15 |
| −27 | 32 | 27 | 32 | 32 | 19 |
| −23 | 32 | 32 | 32 | 32 | 23 |
| −19 | 32 | 32 | −27 | 32 | 27 |
| −15 | 32 | 32 | −23 | 32 | 32 |
| −11 | 32 | 32 | −19 | | |
| −7 | 32 | 32 | −15 | | |
| −3 | 32 | 32 | −11 | | |
| 0 | 32 | 32 | −7 | | |
| 3 | 32 | 32 | −3 | | |
| 7 | 32 | 32 | 0 | | |
| 11 | 32 | 32 | 3 | | |
| 15 | 32 | 32 | 7 | | |
| 19 | 32 | 32 | 11 | | |

As described above with reference to FIG. 15, a location of a current pixel P located on an ith place based on an up border of a current block and a jth place based on a left border of the current block is P(j,i), and an upper neighboring pixel A and a left neighboring pixel B located on an extended line passing through the current pixel P and having a gradient of $\tan^{-1}(dy/dx)$ are located on (j+i*dx/dy,0) and (0,i+j*dy/dx), respectively. Accordingly, when intra prediction is performed by using software or hardware, calculation like i*dx/dy or j*dy/dx is needed.

When calculation like i*dx/dy is needed, available values of dx/dy or C*dx/dy obtained by multiplying a predetermined constant C may be stored in a table and locations of neighboring pixels used to intra predict a current pixel may be determined by using the value stored in the table which is previously prepared during actual intra prediction. That is, various values of (dx, dy) determined according to prediction modes as shown in Table 1 and available values of i*dx/dy considering a value of 'I' determined according to a size of a block may be previously stored in a table and may be used during intra prediction. In detail, if C*dx/dy has N different number of values, the N different number of values of C*dx/dy may be stored as dyval_table[n] (n=0 . . . an integer to N−1).

Likewise, when calculation like j*dy/dx is needed, available values of dy/dx or C*dy/dx obtained by multiplying a predetermined constant C may be previously stored in a table and locations of neighboring pixels used to intra predict a current pixel may be determined by using the values stored in the table that is previously prepared during actual intra prediction. That is, various values of (dx, dy) determined according to prediction modes as shown in Table 1 and available values of j*dy/dx considering a value of T determined according to a size of a block may be previously stored in a table and may be used for intra prediction. In detail, when C*dy/dx has N different number of values, the N different number of values of C*dy/dx may be stored as dxval_table[n] (n=0 . . . an integer to N−1).

As such, once values of C*dx/dy or C*dy/dx are previously stored in a table, locations of pixels of a neighboring block to be used to predict a current pixel may be determined by using values stored in the table corresponding to i*dx/dy and j*dy/dx without additional calculation.

For example, it is assumed that in order to form prediction modes in a similar shape to that shown in FIG. 17, dy is 32, dx is one of {0, 2, 5, 9, 13, 17, 21, 26, and 32}, and a constant C is 32. In this case, since C*dy/dx is 32*32/dx and has one from among values {0, 512, 205, 114, 79, 60, 49, 39, and 32} according to a value of dx, the values {0, 512, 205, 114, 79, 60, 49, 39, and 32} may be stored in a table and may be used for intra prediction.

Figure 19:
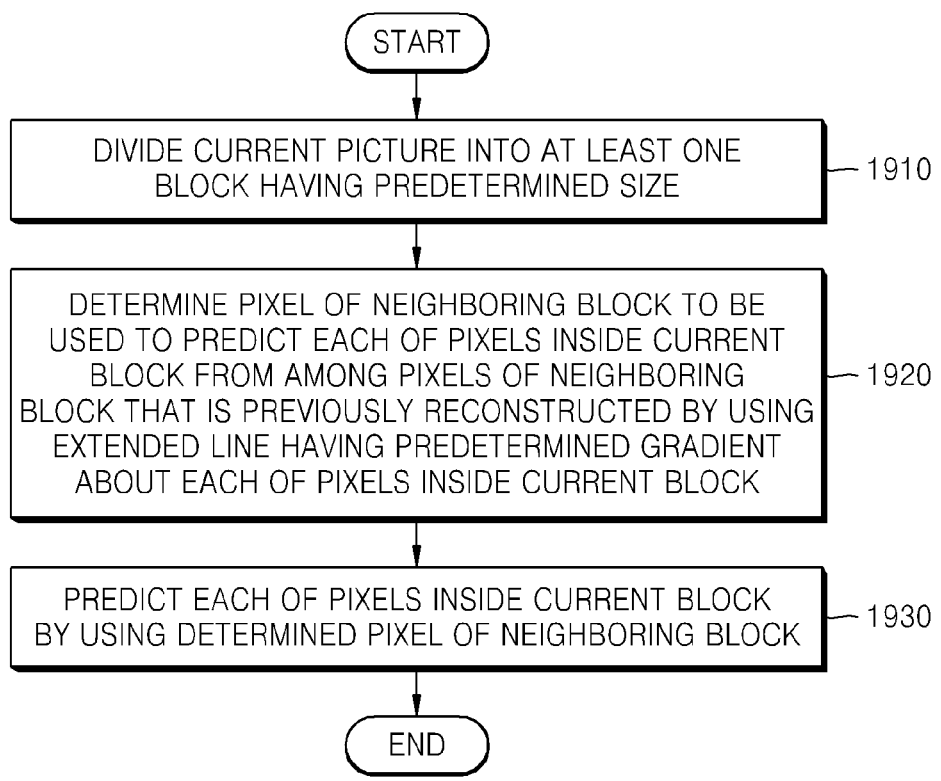
FIG. 19 is a flowchart illustrating a method of encoding an image through intra prediction, according to an exemplary embodiment.

FIG. 19 is a flowchart illustrating a method of encoding an image through intra prediction, according to an exemplary embodiment.

Referring to FIG. 19, in operation 1910, a current picture is divided into at least one block having a predetermined size. As described above, the current picture is not limited to a macroblock having a size of 16×16, and may be divided into blocks hazing sizes of 2×2, 4×4, 8×8, 16×16, 32×32, 64×64, 128×128, or a greater size.

In operation 1920, a pixel of a neighboring block to be used to predict each of pixels inside the current block is determined from among pixels of the neighboring block which are previously reconstructed by using an extended line having a predetermined gradient. As described above, a location of a current pixel P located on an ith place based on an upper border of the current block and located on a jth place based on a left border of the current block is P(j,i), and an up neighboring pixel and a left neighboring pixel located on an extended line passing through the current pixel P and having a gradient of $\tan^{-1}(dy/dx)$ are located respectively on (j+i*dx/ dy,0) and (0,i+j*dy/dx). In order to reduce the amount of calculation of dx/dy and dy/dx needed to determine the location of the neighboring pixel, it is preferable that a value of at least one of dx and dy is a power of 2. Also, if available values of dx/dy and dy/dx or values obtained by multiplying the values of dx/dy and dy/dx by a predetermined constant are previously stored in a table, the pixel of the neighboring block may be determined by searching for corresponding values in the table without additional calculation.

In operation 1930, each of the pixels inside the current block is predicted by using the determined pixel of the neighboring block. That is, a pixel value of the neighboring block is predicted as a pixel value of the current block, and a prediction block of the current block is generated by repeatedly performing the above operations on each of the pixels inside the current block.

Figure 20:
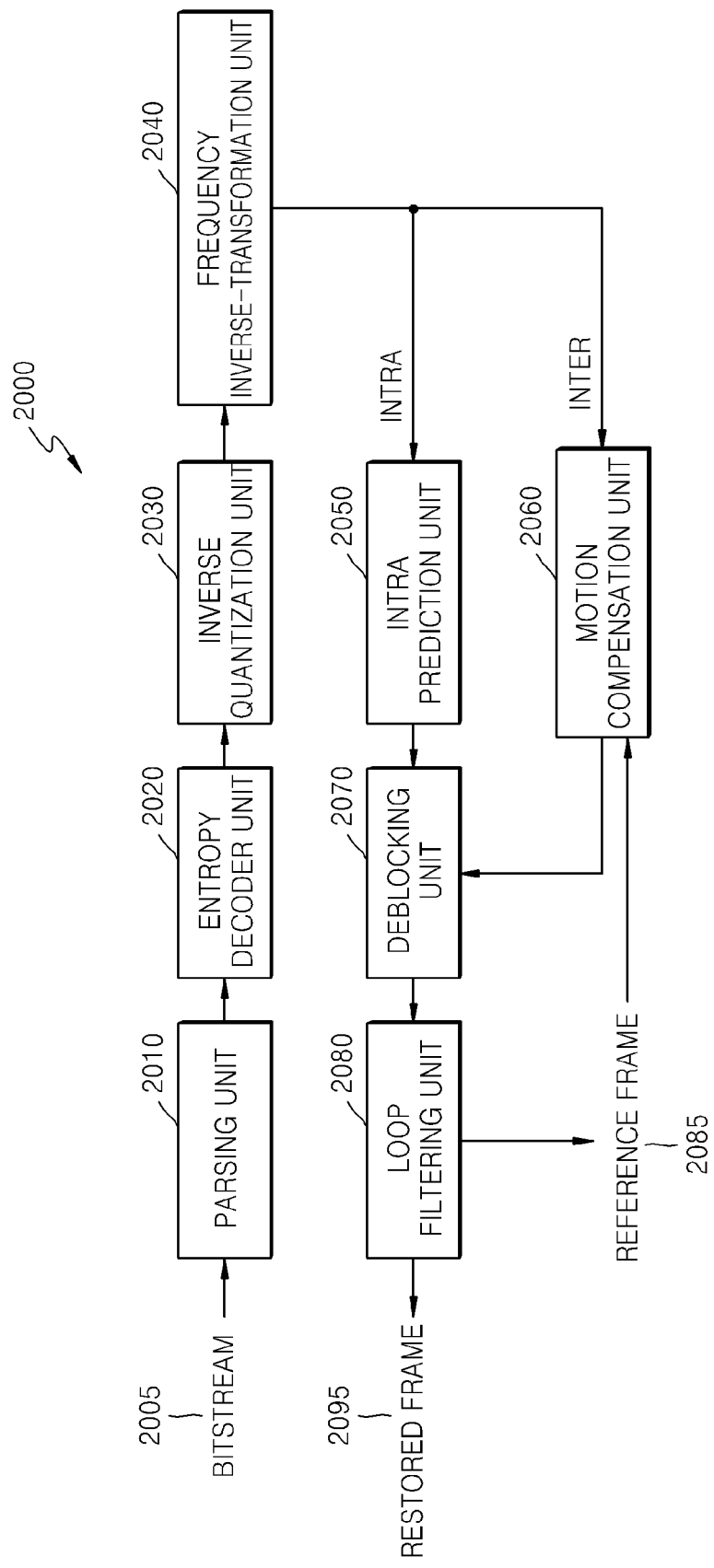
FIG. 20 is a block diagram illustrating an apparatus for decoding an image, according to an exemplary embodiment.

FIG. 20 is a block diagram illustrating an apparatus 2000 for decoding an image, according to an exemplary embodiment.

Referring to FIG. 20, the apparatus 2000 includes a parsing unit 2010, an entropy decoder unit 2020, an inverse quantization unit 2030, a frequency-inverse transformation unit 2040, an intra prediction unit 2050, a motion compensation unit 2060, a deblocking unit 2070, and a loop filtering unit 2080. Here, the intra prediction unit 2050 corresponds to an apparatus for decoding an image through intra prediction.

A bitstream 2005 passes through the parsing unit 2010, and encoding information needed for decoding and image data of a current block to be decoded are extracted. Encoded image data is output as inverse quantized data through the entropy decoding unit 2020 and the inverse quantization unit 2030, and is restored as residual values through the frequency inverse transformation unit 2040.

The motion compensation unit 2060 and the intra prediction unit 2050 generate a prediction block of the current block by using the parsed encoding information of the current block. In particular, the intra prediction unit 2050 determines a pixel of a neighboring block to be used to predict each of pixels inside the current block from among pixels of the neighboring block which are previously reconstructed by using an extended line having a predetermined gradient determined according to an intra prediction mode included in the bitstream. As described above, in order to reduce the amount of calculation of dx/dy and dy/dx needed to determine a location of the neighboring pixel, it is preferable that a value of at least one of dx and dy is a power of 2. Also, the intra prediction unit 2050 may previously store available values of dx/dy and dy/dx or values obtained by multiplying the values of dx/dy and dy/dx by a predetermined constant in a table, determine a pixel of a neighboring block by searching for corresponding values in the table, and perform intra prediction by using the determined pixel of the neighboring block.

A prediction block generated in the motion compensation unit 2060 or the intra prediction unit 2050 is added to the residual values to restore the current frame 2095. The restored current frame may be used as reference frame 2085 of a next block through the deblocking unit 2070 and the loop filtering unit 2080.

Figure 21:
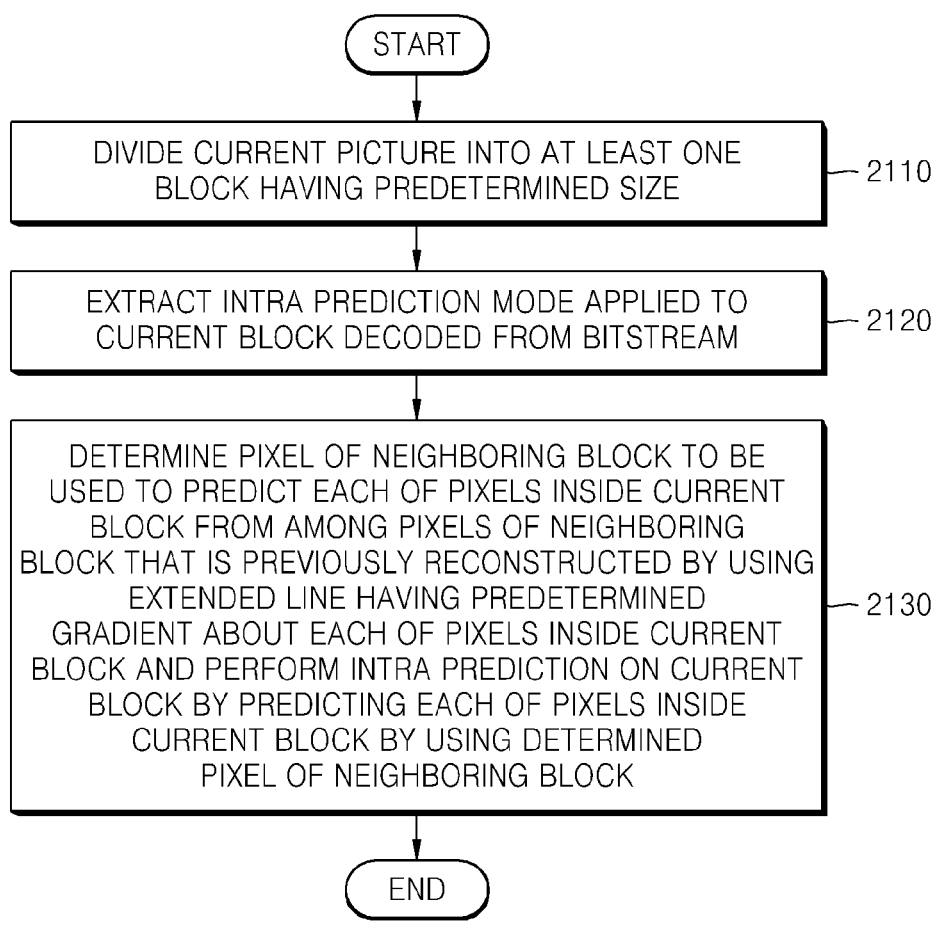
FIG. 21 is a flowchart illustrating a method of decoding an image through intra prediction, according to an exemplary embodiment.

FIG. 21 is a flowchart illustrating a method of decoding an image through intra prediction, according to an exemplary embodiment.

Referring to FIG. 21, in operation 2110, a current picture is divided into at least one block having a predetermined size.

In operation 2120, intra prediction mode information applied to the current block to be decoded is extracted from a bitstream. The intra prediction mode information may be a mode difference value between an actual intra prediction mode and a predicted intra prediction mode predicted from neighboring blocks of a current block or mode values of intra prediction modes having various directivities defined by using (dx, dy) parameters as described above. If the mode difference value is transmitted as prediction mode information, the intra prediction unit 2050 may predict and determine a predicted intra prediction mode of the current block from intra prediction modes of neighboring blocks which are previously decoded, and determine an intra prediction mode of the current block by adding a mode difference value extracted from the bitstream to a mode value of the predicted prediction intra prediction mode.

In operation 2130, the intra prediction unit 2050 determines a pixel of a neighboring block to be used to predict each of pixels inside the current block from among pixels of the neighboring block which are previously reconstructed by using an extended line having a predetermined gradient according to the extracted prediction mode. As described above, a location of a current pixel P located on an ith place based on an upper border of the current block and a jth place based on a left border of the current block is P(j,i), and an upper neighboring pixel and a left neighboring pixel located on an extended line passing through the current pixel P and having a gradient of $\tan^{-1}(dy/dx)$ are respectively located on (j+i*dx/dy,0) and (0,i+j*dy/dx). In order to reduce the amount of calculation of dx/dy and dy/dx needed to determine a location of a neighboring pixel, it is preferable that a value of at least one of dx and dy is a power of 2. Also, available values of dx/dy and dy/dx or values obtained by multiplying the values of dx/dy and dy/dx by a predetermined constant may be previously stored in a table and a pixel of a neighboring block may be determined by searching for corresponding values in the table. The intra prediction unit 2050 predicts a pixel value of the determined neighboring block as a pixel value of the current block, and a prediction block of the current block is generated by repeatedly performing the above operations on each of the pixels inside the current block.

The exemplary embodiments may be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

The apparatuses, encoders, and decoders of the exemplary embodiments may include a bus coupled to every unit of the apparatus, at least one processor (e.g., central processing unit, microprocessor, etc.) that is connected to the bus for controlling the operations of the apparatuses to implement the above-described functions and executing commands, and a memory connected to the bus to store the commands, received messages, and generated messages.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of decoding an image, the method comprising:

extracting an intra prediction mode of a current block from a bitstream, the intra prediction mode indicating a particular direction among a plurality of directions, wherein the particular direction is indicated by using one of a dx number in a horizontal direction and a fixed number in a vertical direction, or a dy number in the vertical direction and a fixed number in the horizontal direction, wherein dx and dy are integers;

determining a number of neighboring pixels located on a left side of the current block or an upper side of the current block;

determining a location of one or more neighboring pixels among the neighboring pixels located on the left side of the current block or the upper side of the current block using a bitwise shift operation based on a position of a current pixel (j, i) and one of the dx or dy numbers indicating the particular direction, where j and i are integers; and performing intra prediction on the current block using the number of neighboring pixels and the location of the one or more neighboring pixels, wherein the performing of the intra prediction comprises calculating a value of the current pixel using the number of neighboring pixels, and the location of the one or more neighboring pixels;

wherein:

the location of the one or more neighboring pixels located on the upper side of the current block is determined based on i*dx>>m, where i is a position of the current pixel in the vertical direction, dx is the dx number in the horizontal direction, m is related to the fixed number in the vertical direction, and >> is the bitwise shift operation, and the location of the one or more neighboring pixels located on the left side of the current block is determined based on j*dy>>n, where j is a position of the current pixel in the horizontal direction, dy is the dy number in the vertical direction, and n is related to the fixed number in the horizontal direction, wherein the bitwise shift operation operates on a binary representation of i*dx and j*dy.

2. The method of claim 1, wherein the particular direction is indicated by an angle of $\tan^{-1}(dy/dx)$.

3. The method of claim 1, wherein the particular direction is indicated by an angle of $\tan^{-1}(dy/dx)$ and absolute values of dx and dy are set such that a distance between prediction directions close to the horizontal direction or the vertical direction is narrow and a distance between prediction modes close to a diagonal direction is wide.

4. The method of claim 3, wherein the particular direction is indicated by an angle of $\tan^{-1}(dy/dx)$ and dy has a fixed value that is a power of 2, a distance between extended lines decreases as an absolute value of dx is closer to 0 such that the distance between the extended lines decreases as a direction of a determined extended line determined according to values of dx and dy is closer to the vertical direction, and the distance between the extended lines increases as the absolute value of dx is farther from 0 such that the distance between the extended lines increases as the direction of the determined extended line is closer to the horizontal direction.

5. The method of claim 3, wherein the particular direction is indicated by an angle of $\tan^{-1}(dy/dx)$ and dx has a fixed value that is a power of 2, a distance between extended lines decreases as an absolute value of dy is closer to 0 such that the distance between the extended lines decreases as a direction of a determined extended line determined according to values of dx and dy is closer to the horizontal direction, and the distance between the extended lines increases as the absolute value of dy is farther from 0 such that the distance between the extended lines increases as the direction of the determined extended line is closer to the vertical direction.

6. The method of claim 1, wherein the particular direction is indicated by an angle of $\tan^{-1}(dy/dx)$ and a pixel located at an ith place, i being an integer, based on the upper side of the current block and a jth place, j being an integer, based on the left side of the current block is (j,i), an upper neighboring pixel and a left neighboring pixel close to an extended line about the pixel (j, i) are respectively (j+i*dx/dy,0) and (0,i+j*dy/dx).

7. The method of claim 6, wherein in the intra prediction mode, available values of c*(dx/dy), c is a constant, are stored, and locations of the upper neighboring pixel and the left neighboring pixel are determined using the stored values.

8. An apparatus for encoding an image, the apparatus comprising:

an intra prediction mode determiner which determines an intra prediction mode of a current block to be encoded, the intra prediction mode indicating a particular direction among a plurality of directions, wherein the particular direction is indicated by using one of a dx number in a horizontal direction and a fixed number in a vertical direction, or a dy number in the vertical direction and a fixed number in the horizontal direction, wherein dx and dy are integers; and an intra prediction performer which determines a number of neighboring pixels located on a left side of the current block or an upper side of the current block, determines a location of one or more neighboring pixels among the neighboring pixels located on the left side of the current block or the upper side of the current block using a bitwise shift operation based on a position of a current pixel (j, i) and one of the dx or dy numbers indicating the particular direction, where j and i are integers, and performs intra prediction on the current block using the number of neighboring pixels and the location of the one or more neighboring pixels, wherein the intra prediction performer performs the intra prediction by calculating a value of the current pixel using the number of neighboring pixels, and the location of the one or more of the neighboring pixels located on the left side of the current block or the upper side of the current block;

wherein:

the location of the one or more neighboring pixels located on the upper side of the current block is determined based on i*dx>>m, where i is a position of the current pixel in the vertical direction, dx is the dx number in the horizontal direction, m is related to the fixed number in the vertical direction, and >> is the bitwise shift operation, and the location of the one or more neighboring pixels located on the left side of the current block is determined based on j*dy>>n, where j is a position of the current pixel in the horizontal direction, dy is the dy number in the vertical direction, and n is related to the fixed number in the horizontal direction, wherein the intra prediction mode determiner and the intra prediction performer are implemented by at least one processor, and wherein the bitwise shift operation operates on a binary representation of i*dx and j*dy.

* * * * *